United States Patent [19]

Asakura

[11] Patent Number: 5,647,614
[45] Date of Patent: Jul. 15, 1997

[54] HOSE FASTENING BAND

[75] Inventor: Sachio Asakura, Kurobe, Japan

[73] Assignee: Toyox Co., Ltd., Toyama-ken, Japan

[21] Appl. No.: 515,520

[22] Filed: Aug. 15, 1995

[30] Foreign Application Priority Data

Aug. 22, 1994 [JP] Japan ............................ 6-219535
Jul. 18, 1995 [JP] Japan ............................ 7-203887

[51] Int. Cl.$^6$ ..................................... F16L 33/10
[52] U.S. Cl. ........................ 285/252; 285/45; 285/407; 285/253; 24/634; 24/19; 24/274 R; 427/287; 264/273
[58] Field of Search ........................ 285/253, 252, 285/254, 251, 367, 410, 45, 365, 407; 24/279, 274 R, 163 K, 634, 19; 248/743; 30/84, 157, 164; 264/273; 427/284

[56] References Cited

U.S. PATENT DOCUMENTS

| | | |
|---|---|---|
| 2,239,536 | 4/1941 | Muros ............................ 427/284 X |
| 2,382,304 | 8/1945 | Foltz et al. ........................ 264/273 X |
| 3,195,205 | 7/1965 | Morriss, Jr. et al. ..................... 24/279 |
| 4,237,588 | 12/1980 | Rasmussen et al. .................. 24/274 R |
| 4,592,575 | 6/1986 | Hughes et al. ...................... 24/274 R |
| 4,956,898 | 9/1990 | Miyamura et al. ................... 24/274 R |
| 4,972,558 | 11/1990 | Maio et al. ......................... 24/274 R |
| 5,038,657 | 8/1991 | Markusch et al. ...................... 427/284 |
| 5,053,178 | 10/1991 | Butlin et al. ......................... 264/273 X |
| 5,234,233 | 8/1993 | Fix ...................................... 285/253 X |

*Primary Examiner*—Randolph A. Reese
*Assistant Examiner*—Heather Shackelford
*Attorney, Agent, or Firm*—Steinberg, Raskin & Davidson, P.C.

[57] ABSTRACT

A band body is covered at a distal end thereof with a cap resulting in safety of a hose fastening band being enhanced. The cap is either molded or mechanically attached to the distal end of the band so the sharp edges are not exposed.

10 Claims, 4 Drawing Sheets

HOSE FASTENING BAND

BACKGROUND OF THE INVENTION

This invention relates to a hose fastening band, and more particularly to a hose fastening band for securely connecting or fastening a hose to a faucet or the like.

A hose fastening band which has been conventionally used for this purpose in the art is typically constructed in such a manner as shown in FIG. 13. More particularly, the conventional hose fastening band includes a band body 1 having one end 1a fixed on a housing 2 and the other end 1b wound once and then inserted into the housing 2. The band body 1 is formed with a plurality of threaded grooves 3. In the housing 2 is incorporated a screw member 4 formed thereon with threads 5, which are engaged with the threaded grooves 3 of the band body 1. Thus, turning of the screw member 4 in a band fastening direction permits the other end 1b of the band body 1 to be fed in a direction indicated at an arrow in FIG. 13, resulting in the band body 1 being contracted or reduced in diameter.

The conventional hose fastening band constructed as described above causes the other end 1b of the band body 1 which is exposed from the housing 2 to be bared, resulting in an operator or user being often damaged, because the other end 1b is generally formed into a keen or sharp configuration. For example, operation of the hose fastening band by an operator often causes a screwdriver to slip from the screw member 4 when turning it while forcing it against the screw member 4, so that the other end 1b of the band body 1 unexpectedly sticks in a band of the operator, leading to damage to the operator.

SUMMARY OF THE INVENTION

The present invention has been made in view of the foregoing disadvantage of the prior art.

Accordingly, it is an object of the present invention to provide a hose fastening band which is capable of preventing an operator from being damaged during handling or operation of the band.

It is another object of the present invention to provide a hose fastening band which is capable of permitting any desired information or indication for identifying the band to be readily applied thereto or put thereon.

It is a further object of the present invention to provide a hose fastening band which is capable of effectively preventing unexpected disassembling of the band due to excessive loosening of the band.

It is still another object of the present invention to provide a hose fastening band which is capable of substantially reducing the manufacturing cost.

It is yet another object of the present invention to provide a hose fastening band which is capable of permitting the manufacturing to be significantly facilitated irrespective of a configuration thereof.

It is a still further object of the present invention to provide a hose fastening band which is capable of permitting the assembling to be facilitated or automatically carried out.

It is a yet further object of the present invention to provide a hose fastening band which is capable of exhibiting increased rigidity.

In accordance with the present invention, a hose fastening band is provided. The hose fastening band includes a housing and a band body adapted to be mounted on a hose and having one end fixed on the housing and the other end inserted into the housing. The band body is formed with threaded grooves. The hose fastening band also includes a screw member arranged in the housing and formed thereon with threads, which are engaged with the threaded grooves of the band body. The screw member is turned to forcibly tighten the band, to thereby fix the hose to any desired position. The hose fastening band further includes a cap arranged on the other end of the band body in a manner to cover the other end of the band body.

In a preferred embodiment of the present invention, the cap is formed by dipping the other end of the band body in a resin liquid or solution to adhere the resin liquid or solution to the other end of the band body and then solidifying the resin liquid or solution adhered to the other end of the band body.

In a preferred embodiment of the present invention, the band body is formed at the other end thereof with a through-hole, via which the cap is integrally formed.

In a preferred embodiment of the present invention, the cap is formed with an insertion hole into which the other end of the band body is inserted and has projections formed in the insertion hole and fitted in the threaded grooves of the band body.

In a preferred embodiment of the present invention, the cap is formed on a surface thereof opposite to the projections in the insertion hole with a rapping hole.

In a preferred embodiment of the present invention, the cap is formed at a position thereof corresponding to the projections in the insertion hole with a thin-wall section sufficient to permit the cap to exhibit elasticity.

In a preferred embodiment of the present invention, the cap is formed on each of both sides thereof with a recess in which a fixture is engagedly hooked. The recess may be formed with a hole.

BRIEF DESCRIPTION OF THE DRAWINGS

These and other objects and many of the attendant advantages of the present invention will be readily appreciated as the same becomes better understood by reference to the following detailed description when considered in connection with the accompanying drawings in which like reference characters designate like or corresponding parts throughout; wherein.

DETAILED DESCRIPTION OF THE PREFERRED EMBODIMENTS

Now, a hose fastening band according to the present invention will be described hereinafter with reference to FIGS. 1 to 12.

Figure 1:
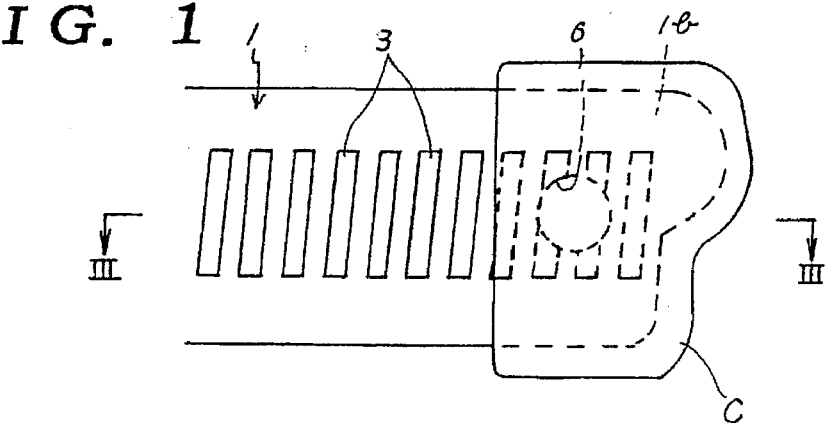
FIG. 1 is a plan view showing a cap incorporated in a first embodiment of a hose fastening band according to the present invention.
Figure 2:
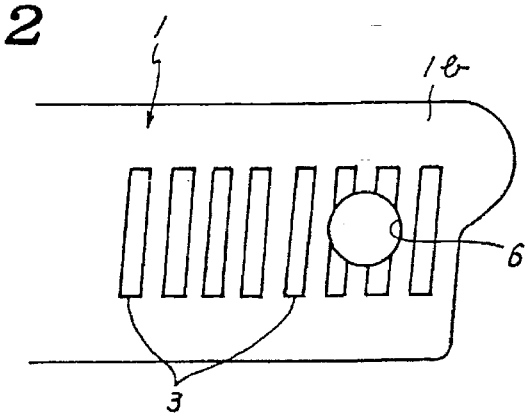
FIG. 2 is a plan view showing a distal end portion of a a band body of the hose fastening band of FIG. 1.
Figure 3:
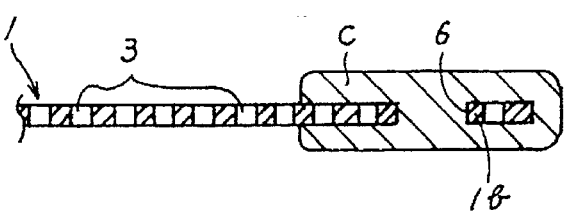
FIG. 3 is a sectional view taken along line III—III of FIG. 1.
Figure 4:
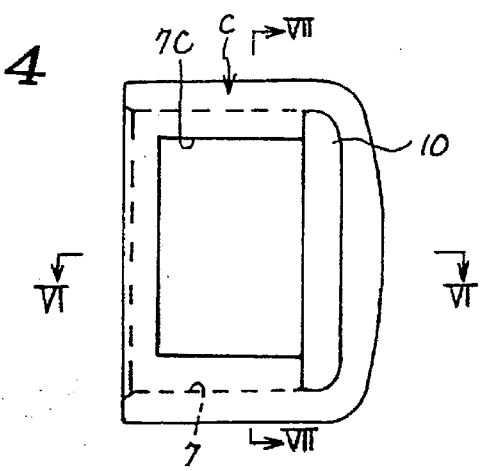
FIG. 4 is a plan view showing a cap incorporated in a second embodiment of a hose fastening band according to the present invention.
Figure 5:
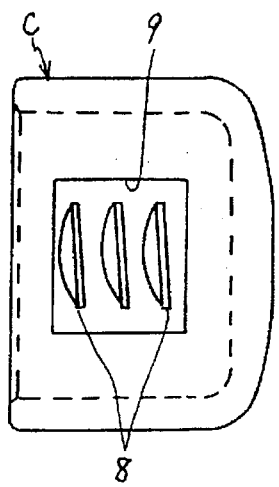
FIG. 5 is a rear view of the cap shown in FIG. 4.
Figure 6:
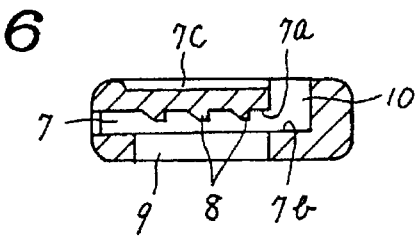
FIG. 6 is a sectional view taken along line VI—VI of FIG. 4.
Figure 7:
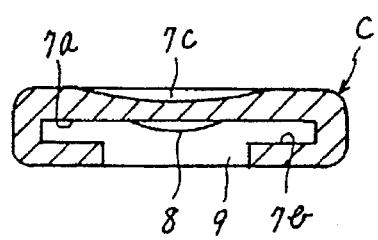
FIG. 7 is a sectional view taken along line VII—VII of FIG. 4.
Figure 8:
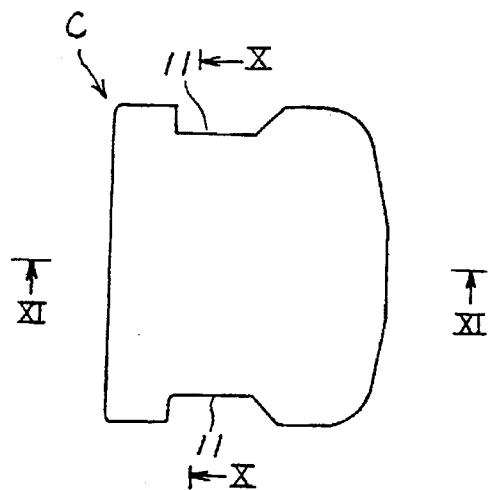
FIG. 8 is a plan view showing a cap incorporated in a third embodiment of a hose fastening band according to the present invention.
Figure 9:
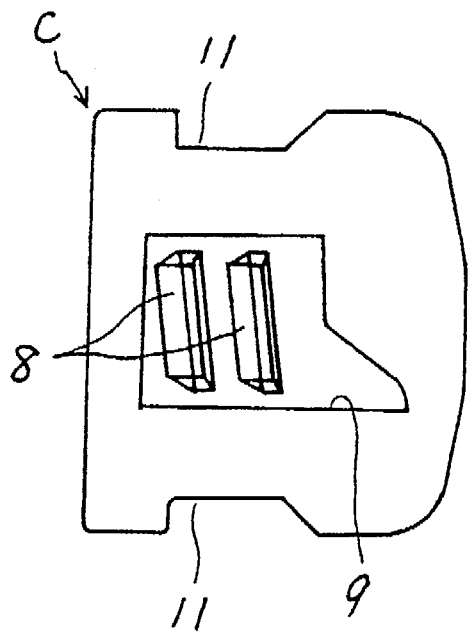
FIG. 9 is a rear view of the cap shown in FIG. 8.
Figure 10:
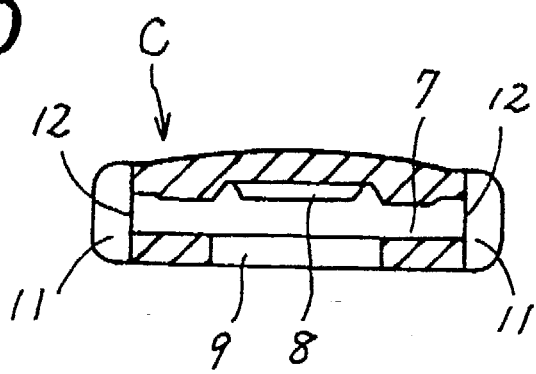
FIG. 10 is a sectional view taken along line X—X of FIG. 8.
Figure 11:
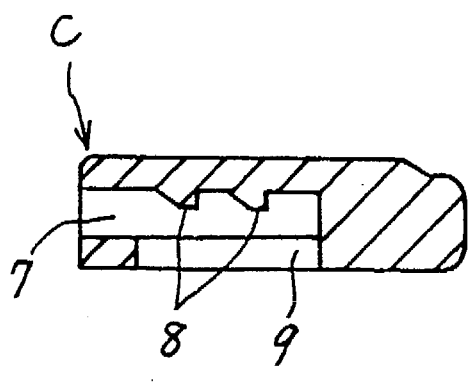
FIG. 11 is a sectional view taken along line XI—XI of FIG. 8.
Figure 12:
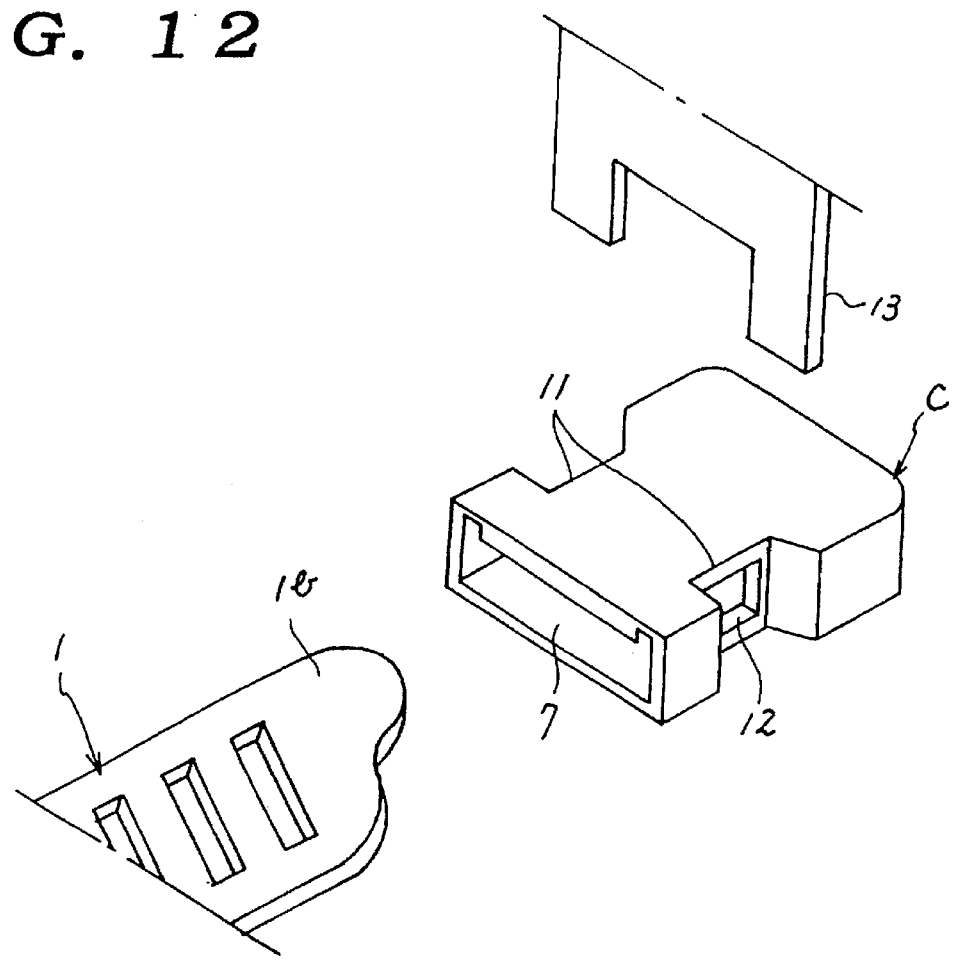
FIG. 12 is an exploded perspective view showing assembling of the cap of FIG. 8.

Referring first to FIGS. 1 to 3, a first embodiment of a hose fastening band according to the present invention is illustrated. A hose fastening band of the illustrated embodiment includes a band body 1, which is formed at the other end or a distal end 1b thereof with a through-hole 6. Then, the distal end 1b of the band body 1 thus formed with the through-hole 6 is dipped in a resin liquid or solution, followed by solidification of the resin solution adhered to the distal end 1b of the band 1, resulting in forming a cap c.

The above-described formation of the through-hole 6 at the distal end 1b of the band body 1, as shown in FIG. 3, permits the cap c to be integrally formed via the through-hole 6, resulting in being securely or firmly mounted on the distal end 1b of the band body 1. Thus, the cap c is kept firmly held on the distal end 1b of the band body 1 so long as a portion of the cap c positioned in the through-hole 6 of the band body 1 is not broken.

Figure 13:
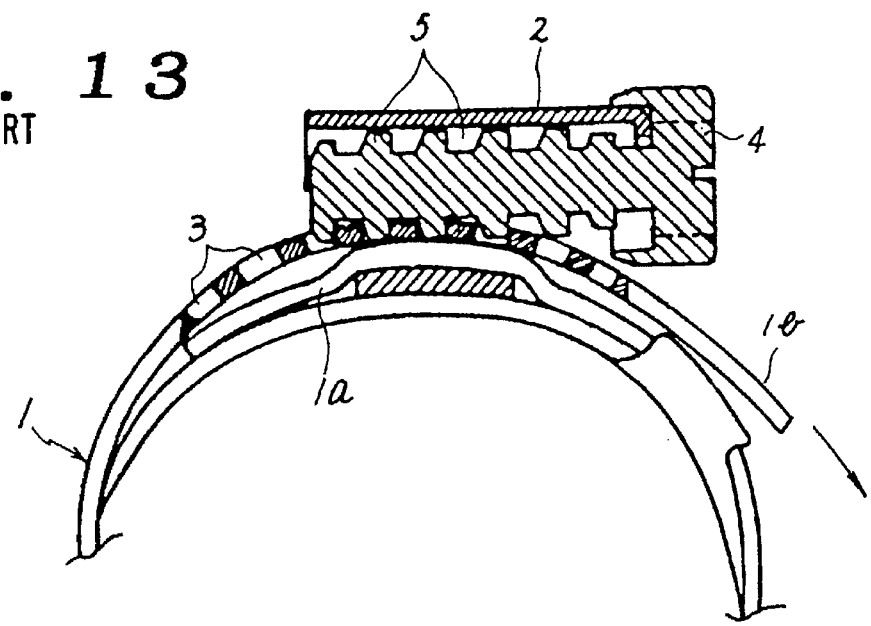
FIG. 13 is a sectional view showing an essential part of a conventional hose fastening band.

The remaining part of the first embodiment may be constructed in substantially the same manner as the prior art described above with reference to FIG. 13.

Thus, the hose fastening band of the first embodiment described above is so constructed that the band body 1 is covered at the distal end thereof with the cap c. Such construction of the first embodiment prevents an operator from being damaged by the hose fastening band even when he accidentally touches the distal end of the band body 1 which is generally formed into a keen or sharp configuration. Also, the cap c put on the distal end 1b of the band body 1 may be colored in order to identify the hose fastening band depending on, for example, applications. Alternatively, the cap may have any desired information other than the above-described color information such as, for example, a product code or the like put thereon.

Conventionally, application of any indication to a hose fastening band has been carried out during molding of the band. Thus, when like hose fastening bands are to be directed to second applications different from first applications, it is required to disadvantageously replace a first mold for hose fastening bands for the first applications which is different in only indication of or information on a product code from a second mold for those for the second applications with the second mold. On the contrary, the illustrated embodiment effectively eliminates such disadvantageous mold replacement as described above which is required in the prior art, because such an indication or information is displayed on the cap.

Also, covering of the distal end 1b of the band body 1 with the cap c in the illustrated embodiment positively prevents unexpected disengagement or removal of the distal end 1b of the band body 1 from a housing when the band is excessively loosened. Thus, it will be noted that the cap c functions also as a stopper.

Referring now to FIGS. 4 to 7, a second embodiment of a hose fastening band according to the present invention is illustrated. In a hose fastening band of the second embodiment, a cap c is made of a rigid resin material. The cap c is formed with an insertion hole 7 into which a distal end 1b of a band body 1 is inserted. The insertion hole 7 is formed on one side surface 7a thereof with projections 8 adapted to be engaged with threaded grooves 3 of the band body 1. Also, the insertion hole 7 is formed with a rapping hole 9 on the other side surface 7b thereof opposite to the one side surface 7a on which the projections 8 are formed. The rapping hole 9 is used for forming the projections 8 in the insertion hole 7 by die forming.

The one side surface 7a of the insertion hole 7 on which the projections 8 are formed is provided with a thin-wall section 7c. Further, the cap c is formed with a window 10 for confirmation in a manner to be positioned in a direction forward of the thin-wall section 7c.

In the hose fastening band of the second embodiment constructed as described above, the cap c is fitted on the distal end 1b of the band body 1, so that the projections 8 of the cap c may be fitted in the threaded grooves 3 of the band body 1, to thereby effectively prevent unexpected disengagement or removal of the cap c from the band body 1.

When the cap c is made of a rigid resin material and the band body 1 is made of a metal material, a decrease in ambient temperature causes the band body 1 to be possibly unexpectedly removed from the cap c because there is a difference in expansion coefficient between both. Fitting of the projections 8 of the cap c in the threaded grooves 3 of the band body 1 in the illustrated embodiment fully prevents the above-described accidental removal or disengagement of the band body 1 from the cap c.

Insertion of the distal end 1b of the band body 1 into the insertion hole 7 may be confirmed by observing the distal end 1b of the band body 1 through the window 10 for confirmation.

In order to fit the projections 8 of the cap c in the threaded grooves 3 of the band body 1, it is required that the projections 8 of the cap c pass between the threaded grooves 3 of the band body 1. In the illustrated embodiment, the thin-wall section 7c of the cap c acts as a spring which permits vertical movement of the projections 8. The thin-wall section 7c of the insertion hole 7 functions as a spring also when the cap c is forcibly disengaged or removed from the distal end 1b of the band body 1, to thereby prevent damage to the projections 8 during the removal, resulting in the cap c being re-used.

Thus, it will be noted that the second embodiment not only ensures safety in handling of the hose fastening band as in the first embodiment but effectively prevents unexpected removal of the distal end 1b of the band body 1 from the housing 2. Also, the second embodiment permits any information indicating means such as a label or the like to be applied to the thin-wall section 7c of the cap c. Further, the embodiment permits the cap c to be effectively re-used after it is forcibly removed from the distal end 1b of the band body 1, because it is not damaged during the removal.

Referring now to FIGS. 8 to 12, a third embodiment of a hose fastening band according to the present invention is illustrated. A hose fastening band of the third embodiment is so constructed that a cap c is formed on each of both sides thereof with a recess 11, which is then formed with a through-hole or aperture 12 for observation. The remaining part of the third embodiment may be constructed in substantially the same manner as the first embodiment described above.

The construction of the third embodiment that the recess 11 is provided on each of both sides of the cap c permits the cap c to be fitted on a distal end 1b of a band body 1 while keeping a fixture 13 for fitting the cap c on the distal end 1b of the band body 1 held or hooked on the cap c through the recesses 11 to automatically move the cap c. Also, the apertures 12 permit fitting of the band body 1 in the cap c to be visually observed therethrough. Further, formation of the apertures 12 leads to a decrease in rigidity of both sides of the cap c sufficient to provide the sides with satisfactory flexibility. This not only facilitates fitting of the cap c on the distal end 1b of the band body 1 even when the insertion hole 7 is formed into a width somewhat smaller than that of the band body 1, but increases tightening force of the cap c.

As can be seen from the foregoing, the hose fastening hand of the present invention is so constructed that the distal end of the band body is covered with the cap. Such construction permits safety of the hose fastening band to be substantially enhanced to a degree sufficient to prevent an operator from being damaged, because he is positively prevented from directly touching the distal end of the band body which is generally formed into a keen or sharp configuration.

Also, in the present invention, the cap may be formed by dipping the other end of the band body in a resin liquid or solution to adhere the resin solution to the other end of the band body and then solidifying the resin solution adhered to the other end of the band body. This permits the resin solution for formation of the cap to enter the threaded grooves of the band body, to thereby substantially prevent the cap formed from being unexpectedly removed from the band body. Also, this permits formation of the cap to be accomplished concurrently with arrangement of the cap on the band body, leading to a decrease in manufacturing cost of the hose fastening band.

In addition, the present invention may be so constructed that the band body is formed at the other end thereof with the through-hole, via which the cap is integrally formed. Such construction more effectively prevents removal of the cap from the band body.

Further, in the present invention, the cap may be formed with the insertion hole into which the other end of the band body is inserted and have the projections formed in the insertion hole and fitted in the threaded grooves of the band body. This ensures rigid mounting of the cap on the band body.

Furthermore, the present invention may be constructed in the manner that the cap is formed on the surface thereof opposite to the projections in the insertion hole with the rapping hole. This permits the cap to be integrally formed by molding irrespective of a configuration of the cap.

Moreover, in the present invention, the cap may be formed at the position thereof corresponding to the projections in the insertion hole with the thin-wall section sufficient to permit the cap to exhibit elasticity. This effectively prevents damage to the projections during assembling and disassembling of the hose fastening band.

Also, formation of the recesses on the cap permits the cap to be automatically fitted on the band by means of the fixture for mounting the cap on the band body.

While preferred embodiments of the invention have been described with a certain degree of particularity with reference to the drawings, obvious modifications and variations are possible in light of the above teachings. It is therefore to be understood that within the scope of the appended claims, the invention may be practiced otherwise than as specifically described.

What is claimed is:

1. A hose fastening band comprising:

a housing;

a band body adapted to be mounted on a hose and having a first end fixed on said housing and a second end opposed to said first end inserted into said housing;

said band body being formed with threads;

a screw member arranged in said housing and formed thereon with threads;

said threads of said screw member being engaged with said threads of said band body;

said screw member being turnable to forcibly tighten said band to fix the hose to any desired position; and a cap arranged on the second end of said band body in a manner to cover the second end of said band body, said cap being formed with an insertion hole into which the second end of said band body is inserted and having projections extending into said insertion hole and fitted in said threads of said band body.

2. A hose fastening band as defined in claim 1, wherein said cap further comprises a rapping hole formed on a surface of said cap opposite to said projections in said insertion hole of said cap.

3. A hose fastening band as defined in claim 1, wherein said cap further comprises a thin-wall section formed on a side surface of said cap at a position corresponding to said projections in said insertion hole sufficient to permit said cap to exhibit elasticity.

4. A hose fastening band as defined in claim 1 wherein said cap is formed on each of both sides thereof with a recess in which a fixture for mounting said cap on said distal end of said band body is engagedly held.

5. A hose fastening band as defined in claim 4, wherein said recess is formed with a hole.

6. A hose fastening band as defined in claim 1, wherein said cap is formed from a rigid resin material.

7. A hose fastening band as defined in claim 3, further comprising a window located at a position forward of said thin-wall section.

8. A hose fastening band as defined in claim 1, wherein said band body is formed from a metal material.

9. A hose fastening band as defined in claim 3, wherein said thin-wall section acts as a spring which permits vertical movement of said projections.

10. A hose fastening band as defined in claim 3, wherein means for indicating information is applied to said thin-wall section.

* * * * *